(12) United States Patent
Gilb et al.

(10) Patent No.: US 10,889,060 B2
(45) Date of Patent: Jan. 12, 2021

(54) ADDITIVELY MANUFACTURED INTEGRATED HANDLING PROTECTION

(71) Applicant: Rosemount Aerospace Inc., Burnsville, MN (US)

(72) Inventors: Andrew Gilb, Savage, MN (US); Scott D. Isebrand, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 171 days.

(21) Appl. No.: 16/000,412

(22) Filed: Jun. 5, 2018

(65) Prior Publication Data

US 2019/0366642 A1 Dec. 5, 2019

(51) Int. Cl.
| | | |
|---|---|---|
| *B33Y 80/00* | (2015.01) | |
| *B33Y 40/00* | (2020.01) | |
| *B29C 64/379* | (2017.01) | |
| *B22F 3/105* | (2006.01) | |
| *B22F 3/24* | (2006.01) | |
| *B22F 3/15* | (2006.01) | |

(52) U.S. Cl.
CPC .......... *B29C 64/379* (2017.08); *B22F 3/1055* (2013.01); *B22F 3/24* (2013.01); *B22F 3/15* (2013.01); *B22F 2003/1058* (2013.01); *B22F 2003/248* (2013.01); *B33Y 40/00* (2014.12); *B33Y 80/00* (2014.12)

(58) Field of Classification Search
CPC ........ B35D 59/06; B35D 17/28; B35D 17/52; Y10T 428/12188
See application file for complete search history.

(56) References Cited

U.S. PATENT DOCUMENTS

| 6,186,980 | B1 | 2/2001 | Brunel |
| 8,077,894 | B2 | 12/2011 | McBagonluri et al. |
| 8,221,858 | B2 | 7/2012 | Mannella et al. |
| 9,505,176 | B2 * | 11/2016 | Ederer .................. B22F 1/0059 |

FOREIGN PATENT DOCUMENTS

| DE | 102007033434 A1 | 1/2009 |
| DE | 102007048385 B3 | 1/2009 |
| EP | 3147049 A1 | 3/2017 |

OTHER PUBLICATIONS

Extended European Search Report for EP Application No. 19178115.2, dated Sep. 2, 2019, 8 pages.

* cited by examiner

*Primary Examiner* — Adam Krupicka
(74) *Attorney, Agent, or Firm* — Kinney & Lange, P.A.

(57) ABSTRACT

A component having integral handling protection includes a main body, a fragile portion of the main body, and a removable portion of the main body positioned and configured to protect the fragile portion during handling of the component.

18 Claims, 3 Drawing Sheets

ADDITIVELY MANUFACTURED INTEGRATED HANDLING PROTECTION

BACKGROUND

Additive manufacturing allows for the manufacture of components having complex and/or fragile geometries (e.g., thin walls, internal passageways, ribs). These components must also often undergo several secondary processing steps to create a final product having a desired shape, surface finish, or mechanical properties. This is especially true for components that will be used in harsh operating environments. Protective casings can be used to cover particularly fragile features during secondary processing, but current (i.e., plastic or rubber) casings may not be able to withstand certain secondary processes, and may have to be removed. Thus, the need exists for durable protection that can remain in place throughout secondary processing.

SUMMARY

A component having integral handling protection includes a main body, a fragile portion of the main body, and a removable portion of the main body positioned and configured to protect the fragile portion during handling of the component.

A method of protecting a fragile feature of a component during handling includes building an intermediate component in a layer-by-layer-fashion. The intermediate component includes a main body, a fragile portion of the main body, and a removable portion of the main body positioned and configured to protect the fragile portion.

DETAILED DESCRIPTION

The present invention is directed to an additively manufactured component with integral handling protection. More specifically, the component, in an intermediate form, includes a structure attached to the component and positioned to protect a fragile feature during secondary processing, and is removed after secondary processing to produce a final component. The removable structure is additively manufactured as part of the component.

Figure 1:
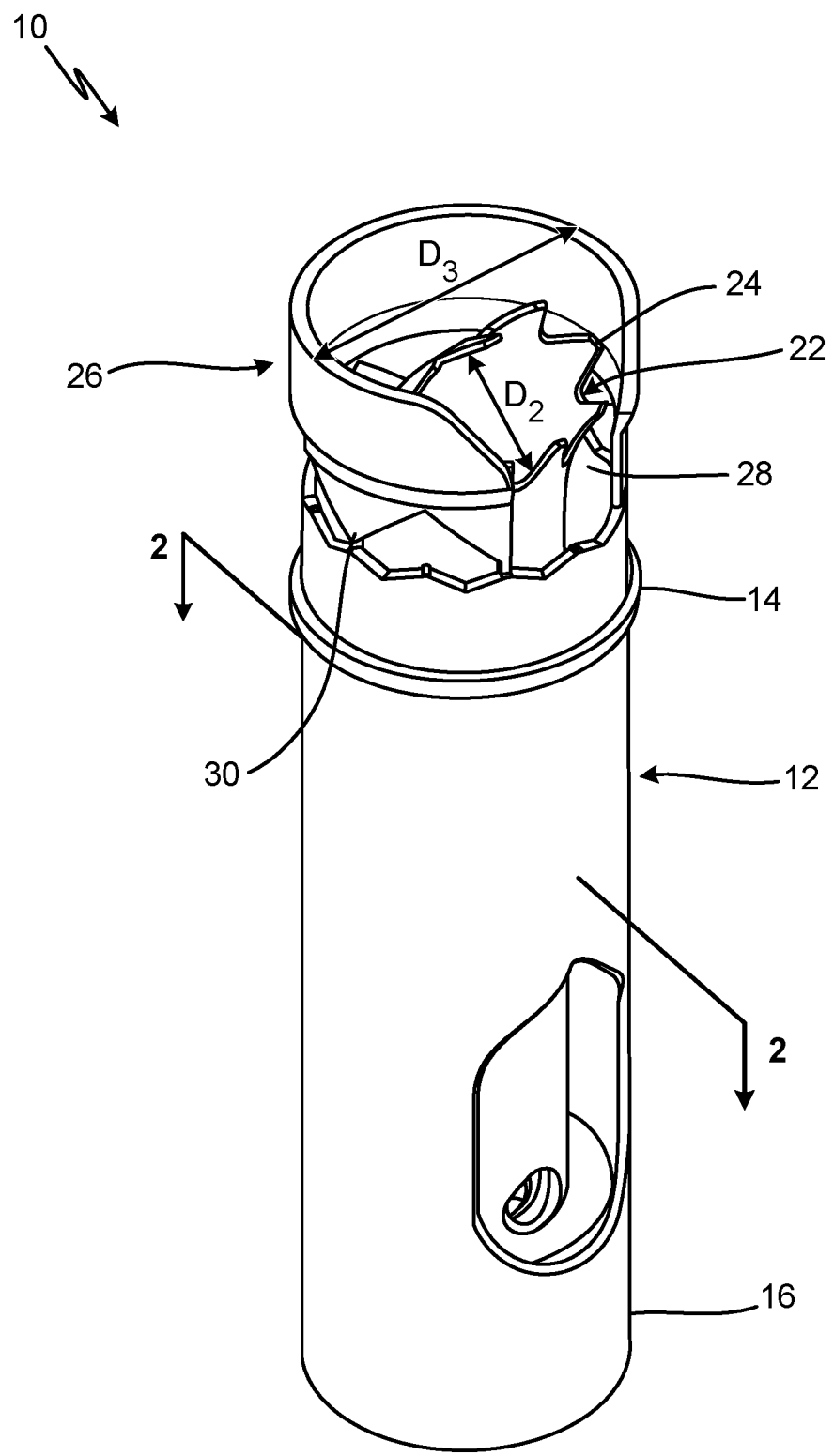
FIG. 1 is a perspective view of a component having integral handling protection.
Figure 2:
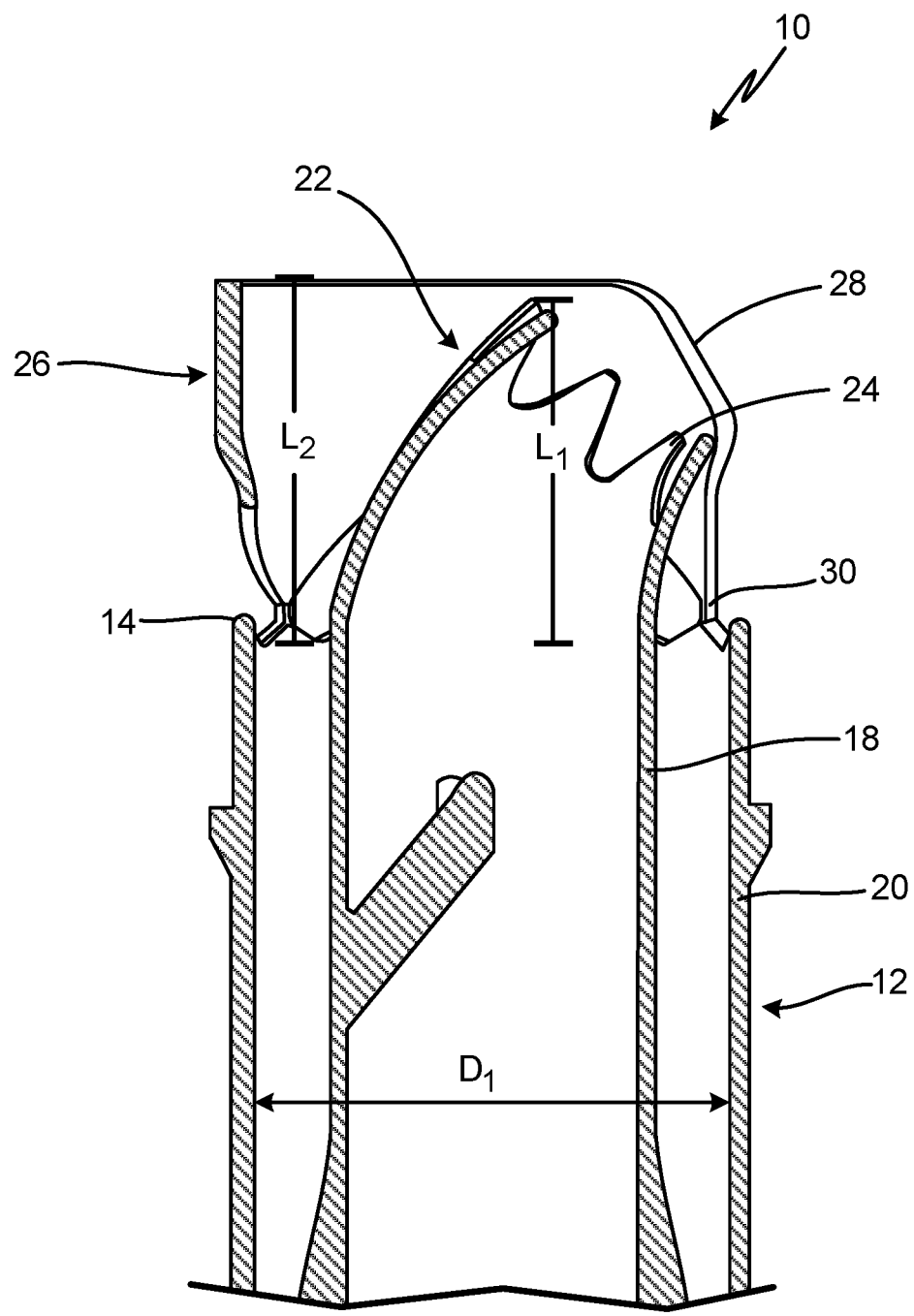
FIG. 2 is a partial cross-sectional view of the component.

FIGS. 1 and 2 are perspective and partial cross-sectional views, respectively, of component 10. As shown, component 10 is an element flow tube intended for use in a total air temperature (TAT) probe assembly (shown in FIG. 3). Component 10 is generally cylindrical, and includes main body 12 having upstream end (top) 14 and downstream end (bottom) 16, based on the orientation of component 10 in the figures. As can be seen in FIG. 2, main body 12 includes inner and outer concentric cylinders 18 and 20, respectively.

With continued reference to FIGS. 1 and 2, tip 22 extends upward from inner cylinder 18 at upstream end 14 of main body 12. Tip 22 includes crenellations 24 which form a series of alternating peaks and valleys. In the embodiment shown, crenellations 24 are tapered with truncated, flat ends. In alternative embodiments, the shape of crenellations can be either tapered or a constant width with sharp, flat, or rounded ends. Further, tip 22 is shown with crenellations 24 at a roughly 45° angle, but can be oriented at other angles, depending on the shape and/or air flow parameters of the TAT probe assembly. Because of its structure and position on component 10, tip 22 with crenellations 24 can be susceptible to damage during secondary processing.

Component 10 also includes removable collar portion 26 extending away from upstream end 14 of main body 12. As can be seen in FIG. 2, tip 22 extends a first length $L_1$ from upstream end 14, while collar 26 extends a second, greater length $L_2$ from upstream end 14. Collar 26 almost fully encircles tip 22, and includes opening 28, which can accommodate specialized tools during secondary processing. In alternative embodiments, opening 28 can be smaller or larger depending on the types of tools used for assembly. If no such tools are needed, collar 26 can instead fully encircle tip 22 such that opening 28 is not present.

Collar 26 is attached to upstream end 14 of main body 14 by a number of thin posts 30. Posts 30 secure collar 26 to main body 12, and also serve as the point of detachment of collar 26 prior to installation of component 10, as is discussed in greater detail below. In an exemplary embodiment, component 10 includes six generally evenly-spaced posts 30. Alternative embodiments can, however, generally include anywhere from three to seven posts, depending on, for example, the specific secondary processing protocol for component 10. The number and spacing of posts 30 can be optimized to balance the need for secure attachment of collar 26 to main body 12, with the desire to quickly and easily remove collar 26. Outer cylinder 20 of main body 12 has a diameter $D_1$ (FIG. 2), which is greater than diameter $D_2$ (FIG. 1) of tip 22 (and generally inner cylinder 18). Collar 26 has a diameter $D_3$ (FIG. 1) which, as shown, is roughly equivalent to $D_1$. In alternative embodiments, however, $D_3$ can be larger or smaller than $D_1$, depending on design parameters and/or protection requirements.

Component 10 can be formed using a powder bed fusion additive manufacturing technique, such as selective laser melting (SLM) in an exemplary embodiment. A digital model of component 10 with collar 26 is inputted into an additive manufacturing apparatus such that collar 26 is integrally formed with the rest of component 10 to create an intermediate (i.e., pre-installation) version of component 10. Component 10 can be formed from a metallic material, such as a nickel-chromium alloy. Alternative embodiments can be formed from other metallic materials, based on, for example, material availability or the desired strength and fabricability of component 10.

After manufacturing, component 10 can undergo one or more secondary processing steps. For example, component 10 can undergo one or more high-temperature treatments, such as an annealing process and/or a hot isostatic pressing (HIP) process to improve the mechanical properties of component 10. Any resulting surface oxidation can then be removed using a process such as chemical etching, machining, buffing, or grit blasting, to name a few, non-limiting examples. Component 10 can further be welded or brazed as it is assembled with additional sub-components of the TAT probe assembly. During secondary processing, the configuration (e.g., shape, size, positioning, etc.) of collar 26 protects tip 22 with crenellations 24 from handling damage such as dropping or denting/bending with a tool. After secondary processing and prior to installation, an operator can remove collar 26 by mechanically severing (e.g., with diagonal pliers) posts 30 at the attachment to main body 12. Any remnants of posts 30 on main body 12 can be removed by sanding or trimming, or can be left in place.

Figure 3:
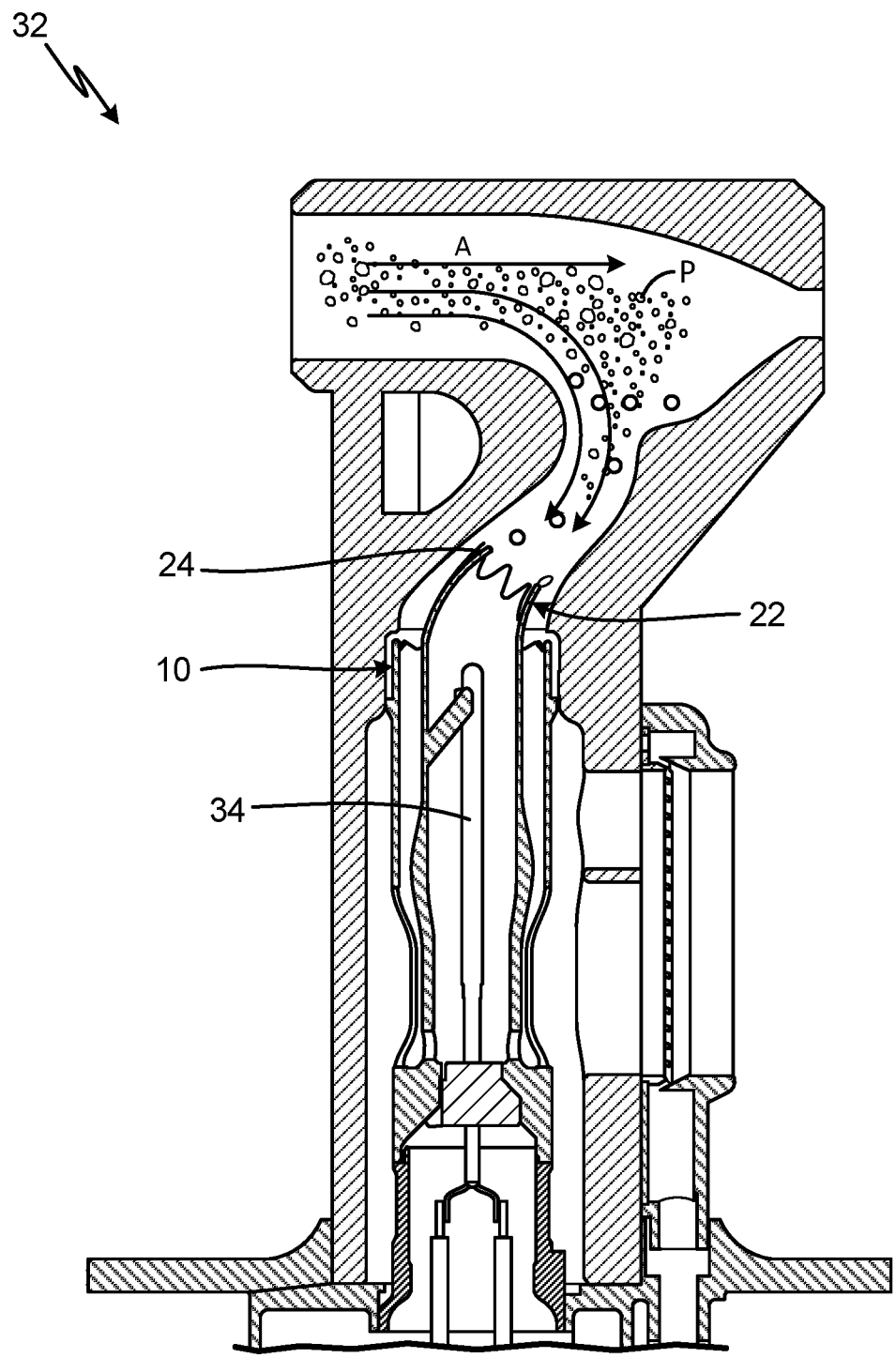
FIG. 3 is a cross-sectional view of the component in final form and installed within a larger assembly.

FIG. 3 is a cross-sectional view of component (element flow tube) 10 in final form and installed within TAT probe assembly 32. In operation, tip 22 with crenellations 24 comes into contact with airflow A and particles P, which can freeze to form ice. Crenellations 24 decrease ice accretion at tip 22, which protects sensing element 34 disposed within component 10, thus allowing for more accurate measurements from assembly 32.

Additively manufactured component 10 has many benefits. As is discussed above, the crenellated tip is critical for proper functioning of the TAT probe assembly. Additive manufacturing allows for the creation of very precise geometries at the tip, and also allows for the formation of an integral collar to protect the tip from damage during handling and secondary processing. Because it is formed from the same metallic material as the component, the protective collar can also withstand the various thermal and chemical treatments, such that it does not need to be removed during these steps. Finally, the protective collar can fairly easily be removed for final installation. Although discussed in the context of a temperature sensing application, integral handling protection can generally be used for any application with additively manufactured components with fragile features requiring protection prior to installation or use.

Discussion of Possible Embodiments

The following are non-exclusive descriptions of possible embodiments of the present invention.

A component having integral handling protection includes a main body, a fragile portion of the main body, and a removable portion of the main body positioned and configured to protect the fragile portion during handling of the component.

The component of the preceding paragraph can optionally include, additionally and/or alternatively, any one or more of the following features, configurations and/or additional components:

In the above component, the fragile portion can include a tip extending away from an upstream end of the main body a first length, the removable portion can include a collar at least partially encircling the tip and extending from the upstream end a second length, and the second length can be greater than the first length.

In any of the above components, the main body can have a first diameter, the tip can have a second diameter, and the collar can have a third diameter.

In any of the above components, the second diameter can be smaller than the first diameter.

In any of the above components, the second diameter can be smaller than the third diameter.

In any of the above components, the first diameter can be equal to the third diameter.

In any of the above components, the tip can include crenellations forming a plurality peaks and valleys.

In any of the above components, a plurality of posts can connect the collar to the main body.

In any of the above components, the plurality of posts can include at least three posts.

In any of the above components, the component can be monolithically formed from a metallic material.

A method of protecting a fragile feature of a component during handling includes building an intermediate component in a layer-by-layer-fashion. The intermediate component includes a main body, a fragile portion of the main body, and a removable portion of the main body positioned and configured to protect the fragile portion.

The method of the preceding paragraph can optionally include, additionally and/or alternatively, any one or more of the following features, configurations and/or additional components:

In the above method, the fragile portion can include a tip extending away from an upstream end of the main body a first length, the removable portion can include a collar at first diameter, the tip has a second diameter, and the collar has a third diameter.

3. The component of claim 2, wherein the second diameter is smaller than the first diameter.
least partially encircling the tip and extending from the upstream end a second length, and the second length can be greater than the first length.

Any of the above methods can further include performing a secondary processing step on the intermediate component, and removing the collar from the main body.

Any of the above methods can further include installing the final component into an assembly.

In any of the above methods, the secondary processing step can be a thermal treatment.

In any of the above methods, the secondary processing step can be an oxidation removal process selected from the group consisting of chemical etching, machining, buffing, grit blasting, and combinations thereof.

In any of the above methods, the secondary processing step can be a welding or brazing process.

In any of the above methods, the collar can be connected to the main body by a plurality of posts, and the removing step can include mechanically severing the plurality of posts.

In any of the above methods, the intermediate component can be formed from a metallic material.

In any of the above methods, the building step can be carried out using a powder bed fusion technique.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A component having integral handling protection, the component comprising:
   a main body;
   a fragile portion of the main body; and
   a removable portion of the main body positioned and configured to protect the fragile portion during handling of the component;
   wherein the fragile portion comprises a tip extending away from an upstream end of the main body a first length;
   wherein the removable portion comprises a collar at least partially encircling the tip and extending from the upstream end a second length;
   wherein the second length is greater than the first length; and
   wherein the tip includes crenellations forming a plurality peaks and valleys.

2. The component of claim 1, wherein the main body has a first diameter, the tip has a second diameter, and the collar has a third diameter.

3. The component of claim 2, wherein the second diameter is smaller than the first diameter.

4. The component of claim 3, wherein the second diameter is smaller than the third diameter.

5. The component of claim 3, wherein the first diameter is equal to the third diameter.

6. The component of claim 1, wherein a plurality of posts connect the collar to the main body.

7. The component of claim 6, wherein the plurality of posts comprises at least three posts.

8. The component of claim 1, wherein the component is monolithically formed from a metallic material.

9. A method of protecting a fragile feature of a component during handling, the method comprising: building, in a layer-by-layer fashion, an intermediate component comprising:
    a main body;
    a fragile portion of the main body; and
    a removable portion of the main body and positioned and configured to protect the fragile portion
    wherein the fragile portion comprises a tip extending away from an upstream end of the main body a first length;
    wherein the removable portion comprises a collar at least partially encircling the tip and extending from the upstream end a second length;
    wherein the second length is greater than the first length; and
    wherein the tip includes crenellations forming a plurality peaks and valleys.

10. The method of claim 9 and further comprising: performing a secondary processing step on the intermediate component, and removing the collar from the main body.

11. The method of claim 10 and further comprising: installing the component into an assembly.

12. The method of claim 10, wherein the secondary processing step is a thermal treatment.

13. The method of claim 10, wherein the secondary processing step is an oxidation removal process selected from the group consisting of chemical etching, machining, buffing, grit blasting, and combinations thereof.

14. The method of claim 10, wherein the secondary processing step is a welding or brazing process.

15. The method of claim 9, wherein the collar is connected to the main body by a plurality of posts, and wherein the removing step comprises mechanically severing the plurality of posts.

16. The method of claim 9, wherein the intermediate component is formed from a metallic material.

17. The method of claim 9, wherein the building step is carried out using a powder bed fusion technique.

18. A component having integral handling protection, the component comprising:
    a main body;
    a fragile portion of the main body; and
    a removable portion of the main body positioned and configured to protect the fragile portion during handling of the component;
    wherein the fragile portion comprises a tip extending away from an upstream end of the main body a first length;
    wherein the removable portion comprises a collar at least partially encircling the tip and extending from the upstream end a second length;
    wherein the second length is greater than the first length; and
    wherein the component is monolithically formed from a metallic material.

* * * * *